(12) United States Patent
Philipson

(10) Patent No.: US 7,252,691 B2
(45) Date of Patent: Aug. 7, 2007

(54) CONVERSION OF MUNICIPAL SOLID WASTE TO HIGH FUEL VALUE

(76) Inventor: John Philipson, 86 Parkview Lane, Strathroy, Ontario (CA) N7G 4A3

( * ) Notice: Subject to any disclaimer, the term of this patent is extended or adjusted under 35 U.S.C. 154(b) by 332 days.

(21) Appl. No.: 09/801,182

(22) Filed: Mar. 6, 2001

(65) Prior Publication Data

US 2002/0184816 A1 Dec. 12, 2002

(51) Int. Cl.
*C01L 5/40* (2006.01)
(52) U.S. Cl. .......................... 44/552; 44/589; 44/590; 44/593; 44/595; 44/596; 44/605; 44/606
(58) Field of Classification Search ................. 44/552, 44/589, 590–593, 595–596, 605–606
See application file for complete search history.

(56) References Cited

U.S. PATENT DOCUMENTS

| 3,473,494 A |   | 10/1969 | Siracusa |
| 3,584,587 A |   | 6/1971  | Sircusa |
| 3,961,913 A | * | 6/1976  | Brenneman et al. ... 48/197 FM |
| 4,152,119 A | * | 5/1979  | Schulz ........................ 44/530 |
| 4,225,457 A | * | 9/1980  | Schulz ........................ 252/373 |
| 4,496,365 A |   | 1/1985  | Lindemann |
| 4,661,119 A | * | 4/1987  | Andersson et al. ........... 44/559 |
| 5,100,066 A | * | 3/1992  | Frei ............................. 241/21 |
| 5,429,645 A |   | 7/1995  | Benson et al. |
| 5,431,702 A |   | 7/1995  | Schulz |
| 5,562,743 A | * | 10/1996 | Daugherty et al. ........... 44/589 |
| 5,779,164 A | * | 7/1998  | Chieffalo et al. ............. 241/17 |
| 5,888,256 A |   | 3/1999  | Morrison |
| 6,113,662 A | * | 9/2000  | Sprules ........................ 44/535 |
| 6,506,223 B2 | * | 1/2003 | White ........................... 44/551 |

FOREIGN PATENT DOCUMENTS

| CA | 1038335    | 9/1978  |
| DE | 19751629   | 5/1999  |
| DE | 19853151   | 5/2000  |
| DE | 19916271   | 10/2000 |
| EP | 0036784    | 9/1990  |
| EP | 566419     | 10/1997 |
| GB | 1286532    | 8/1972  |
| GB | 1517687    | 7/1978  |
| GB | 2024856    | 1/1980  |
| JP | 4-277072   | 10/1992 |
| JP | 11-310784  | 11/1999 |
| WO | WO 0012234 | 3/2000  |

\* cited by examiner

*Primary Examiner*—Cephia D. Toomer
(74) *Attorney, Agent, or Firm*—Perkins Coie LLP

(57) ABSTRACT

A combustible pellet comprising municipal solid waste. The pellet has a water content of less than 10% by weight and a fuel value of at least 10,000 BTU. A process for the forming of a combustible pellet from municipal solid wastes, comprising the steps of removing solid hazardous waste from said municipal solid waste; subjecting the municipal solid waste so obtained to at least one step to separate recyclable products therefrom; and subjecting the resultant product to a shredding and a pulverizing step. A fluff with a water content of less than 10% by weight is obtained. The fluff is compacted to form a combustible pellet.

38 Claims, 7 Drawing Sheets

Anerobic Digester System

CONVERSION OF MUNICIPAL SOLID WASTE TO HIGH FUEL VALUE

FIELD OF THE INVENTION

The present invention relates to the conversion of municipal solid waste (MSW) to a fuel with a high fuel value, and to a method of treatment of municipal solid waste. In particular, the present invention relates to a municipal solid waste pellet that has a high fuel value and to a process for producing the pellet.

BACKGROUND OF THE INVENTION

One of the largest problems faced by municipalities, and by society in general, is the increase in the amount of municipal solid waste and other wastes generated each year. For instance, 220 million tons of waste is produced each year in North America alone. A study by the United States Environmental Protection Agency (EPA) has revealed that there has been a 42% increase in recycling and composting from 1988 to 1995. Surprisingly, during this same period, the quantity of municipal solid waste still increased. Certified landfill capacity is decreasing and other sites require clean-up. New options of waste management to replace traditional methods e.g. open dumping, landfills and composting, are needed in order to manage the millions of tons of municipal solid waste that are produced each year.

One way to alleviate the above problems is to convert waste to energy. Most waste-to-energy systems used are so-called through-systems i.e. the waste is combined with fuel as required and burned. In a typical 50 megawatt plant, approximately 5000 tons of waste would be burnt per day. There are, however, several disadvantages to this system. For instance, 50 to 60% of the waste processed is transformed into incompletely burned bottom ash. In addition, fly ash is produced, which is classified as hazardous waste. The bottom ash would have to be shipped to a landfill site and the fly ash would have to be sent to a hazardous waste facility.

The burning of raw municipal solid waste also creates heavy metal emissions, especially from the burning of plastics, aluminum and batteries contained in a general unsorted waste stream. An expensive off-gas treatment installation is necessary to reduce these emissions to levels required to meet environmental and other regulations. In addition, if the municipal solid waste is wet, it would, in general, cost more in energy to burn the waste than the actual amount of energy produced from the waste. Nonetheless, production of waste-derived fuel has evolved to become an acceptable approach to waste management. For instance, the waste may be stripped of metal and glass components, and then granulated, shredded and subsequently dried to yield a product with a higher fuel value and lower ash production than an incineration process.

U.S. Pat. Nos. 3,473,494 and 3,584,587 disclose a system for processing raw municipal solid waste, in which non-ferrous waste is passed through a grinder, a shredder and a dryer. Incineration of the resultant product in a furnace results in a by-product of slag or ash, mainly consisting of glass and some plastics, in the form of solid clinker in the base of the furnace. Periodic shut-downs are required for removal of such clinkers. Canadian Patent No. 1,038,335 discloses a further processing step that passes the shredded and dried non-ferrous waste through another separation step in which heavier shredded particles of non-ferrous metal, glass and plastic are separated from lighter particles such as paper, vegetation, and pulp. The lighter particles, in the form of a fluff, are screened to remove dust or grit and then incinerated.

EP 0 036 784 discloses pulverizing municipal solid waste, and then screening to remove fines and oversize material. A light fraction, containing mainly paper and plastics, is separated from the screened residue and pelletized. The ideal moisture content is 10% to 20% by weight, which is lower than a typical wet pulping process e.g. as disclosed in British Patent No. 1,517,687. In the latter, a combustible fraction of waste is obtained from an aqueous slurry containing about 4% to 6% solid waste, by extraction of organic components. The combustible fraction is dried to a moisture content of 10 to 20% by weight, and then pelletized. The energy consumed in the drying step has to be balanced against the energy available from the pelletized fuel. The high water content and the foul aqueous medium obtained detract from the wet pulping process.

British Patent No. 2,024,856 discloses a process wherein a light fraction extracted from municipal solid waste and selectively containing plastics, wood, rags and paper, is subjected to a milling process. The moisture content of the resulting waste may be controlled.

European Patent No. 566,419 discloses introducing an additive, such as calcium oxide/calcium-based bentonite, to comminuted municipal solid waste for odour control.

U.S. Pat. No. 4,496,365 discloses a method of producing fuel briquettes from organic waste products enriched with organic materials such as coal, by adding lime and subsequently compressing the mixture under high pressure. In North America, governments are seeking to phase out coal-fired facilities because of the emissions, such as sulphur, that are produced.

U.S. Pat. No. 5,888,256 discloses a method of producing a fuel by blending one or more waste materials selected from paper mill waste, paper mill lime waste, municipal waste water treatment sludge, wood waste, paper waste, plastic-containing manufacturing waste, fly ash, petroleum-containing sludge, organic agricultural wastes, rubber-containing waste and inorganic mineral-containing waste. A pellet of at least 5500 BTU/lb, or, more preferably, 7000 to 9000 BTU/lb is obtained. It is to be expected that the pellet could cause heavy metal emissions.

Biogas systems are also known. Methane gas can be produced from the fermentation of waste materials such as municipal solid waste, organic waste and food matter. The resultant product is approximately 98% of the input waste, and may be sent to landfill. However, the product is not suitable for composting because the organic and food matter that makes good compost has been used in the methane gas production process. Compost of poor quality is obtained.

Many of the aforementioned processes involve processing the raw municipal solid waste such that a light fraction more suitable for combustion is separated and burned. Therefore, the entire waste is not completely utilized. The heavier fraction of waste must still be disposed of or utilized e.g. as earth fill. It would be more effective if the raw municipal solid waste could be utilized in a more efficient and less hazardous manner.

A process is required that will utilize the majority of municipal solid waste, thereby eliminating or reducing the need for landfill sites and composting. In addition, the waste should provide a high fuel value for generation of energy.

SUMMARY OF THE INVENTION

A municipal solid waste treatment process in which combustible waste is processed to provide high value BTU waste products and a high value fuel pellet has now been found.

Accordingly, one aspect of the present invention provides a combustible pellet comprising municipal solid waste, said pellet having a water content of less than 10% by weight and a fuel value of at least 10,000 BTU per pound.

In preferred embodiments, the pellet additionally comprises at least one waste substance of higher fuel value, to increase the fuel value of the pellet formed from municipal solid waste, the resultant pellet having a fuel value of at least 10,000 BTU per pound. In preferred embodiments, the waste substance of high fuel value is selected from hydrocarbon material, safe industrial waste, commercial and institutional waste, wood, rubber, fibrous material and other waste having a fuel value of at least 10 000 BTU per pound. Preferably, the waste substance of higher fuel value is selected from the group consisting of hydrocarbons, carbon, safe industrial, commercial and institutional waste, carpet, underlay, vinyl flooring, rubbers, tires, automotive insulation, compost residue, coal dust, fabrics, leather, furniture, peat, hemp, jute, sugarcane, coconut husks, corn husks, rice hulls, sewage sludges, wood and paper fibres, and mixtures thereof. In particular, the hydrocarbon is petroleum coke, the carbon is bottom ash, the rubber is synthetic rubber, the wood is selected from the group consisting of bark, chips, sawdust, plywood, particle board, pallets, skids, bush, tree branches and yard waste, and fibres are selected from the group consisting of corrugated cardboard, newspaper, packaging, box board and aseptic board and pulp sludges.

In another embodiment, the pellet is in the form of compacted fluff.

In a further embodiment, the municipal solid waste is free of recyclable materials, especially free of substances selected from the group consisting of glass, metals, plastics and paper.

In a still further embodiment, the emissions released from combustion of the pellet are less than 17 mg/Rm$^3$ of particulate matter, less than 14 μg/Rm$^3$ of cadmium, less than 142 μg/Rm$^3$ of lead, less than 20 μg/Rm$^3$ of mercury, less than 0.14 ng/Rm$^3$ of dioxin/furan, less than 27 mg/Rm$^3$ of hydrochloric acid, less than 56 mg/Rm$^3$ of sulphur dioxide and less than 110 ppmv of nitrogen oxides.

In another preferred embodiment, the pellet on combustion at a temperature of 1150° C. in air has a bottom ash content of less than 10% by weight.

In preferred embodiments, the pellet has a fuel value of at least 12,000 BTU per pound, preferably 12500-14000 BTU per pound and especially at least 14,000 BTU per pound.

In further embodiments, the water content of the pellet is in the range of 1-7 percent by weight.

In other embodiments, the pellet has a length of at least 3 cm and a width of at least 1 cm, especially a length of 5-15 cm and a width of 3.5-8 cm.

In further embodiments, the cross-section of the pellet is substantially circular.

A further aspect of the present invention provides a process for the forming of a combustible pellet from municipal solid wastes, comprising the steps of:

a) removing solid hazardous waste from said municipal solid waste;

b) subjecting the municipal solid waste so obtained to at least one step to separate recyclable products therefrom;

c) subjecting the product of step (b) to a shredding and a pulverizing step, to form a fluff with a water content of less than 10% by weight; and d) compacting the fluff to form a combustible pellet.

In certain embodiments, at least one waste substance of high fuel value is added prior to step (c). In preferred embodiments of the process of the present invention, an additional step of anaerobic digestion follows step (b). Preferably, the amount of municipal solid waste and the amount of said additional waste substance is controlled so that the pellet so obtained has a fuel value of at least 10,000 BTU per pound. Other pellets as defined above may be obtained.

BRIEF DESCRIPTION OF THE DRAWINGS

The present invention is illustrated by the preferred embodiments shown in the drawings, in which.

DETAILED DESCRIPTION OF THE INVENTION

The present invention provides a municipal solid waste treatment process in which recyclable materials are separated from an incoming waste stream, and remaining combustible waste is processed further and enriched with high value BTU waste products to produce a high fuel value pellet. In particular, the pellet has a fuel value of at least 10 000 BTU per pound.

Municipal solid waste may contain a very wide variety of waste or discarded material. For instance, the waste may include biodegradable waste, non-biodegradable waste, ferrous materials, non-ferrous metals, paper or cardboard in a wide variety of forms, a wide range of plastics (some of which may contain traces of toxic metals used as catalysts, stabilizers or other additives), paints, varnishes and solvents, fabrics, wood products, glass, chemicals including medicines, pesticides and the like, solid waste of various types and a wide range of other materials. The waste includes household waste and industrial waste, the latter being so-called "safe" industrial waste i.e. low in toxic or hazardous materials.

Examples of high value BTU waste products that may be used to enrich the municipal solid waste include the following: hydrocarbons, carbon, safe industrial, commercial and institutional waste, carpet, underlay, vinyl flooring, rubbers, tires, automotive insulation, lime, compost residue, coal dust, fabrics, leather, furniture, peat, hemp, jute, sugarcane, coconut husks, corn husks, rice hulls, sewage sludges, wood and paper fibres. More specifically, examples include hydrocarbons such as petroleum coke, carbon such as bottom ash, rubber, such as synthetic rubbers, which may also include tires, wood such as bark, chips, sawdust, plywood, particle board, pallets and skids, bush, tree branches, yard waste, and fibers such as corrugated cardboard, newspaper, packaging, box board, aseptic board and pulp sludges.

It is understood that municipal solid waste would normally contain recyclable materials e.g. plastics, glass, aluminum, paper and other materials that are capable of being recycled.

Raw municipal solid waste typically has a fuel value of approximately 2500 BTU per pound. Processed (dried) municipal solid waste typically has a fuel value of approximately 4000 to 7000 BTU per pound.

One particular embodiment of the present invention involves the treatment of municipal solid waste for removal of recyclable products and hazardous waste, such as paints and solvents. The municipal solid waste fraction obtained is then further treated e.g. shredded and pulverized to form a fluff, which is then pelletized.

Another embodiment of the present invention involves separating fine fibres and then removing recyclable products from municipal solid waste. The municipal solid waste fraction obtained is re-mixed with fine fibres, as well as paper. The product obtained is shredded and pulverized to form a fluff, which is then pelletized.

Figure 1:
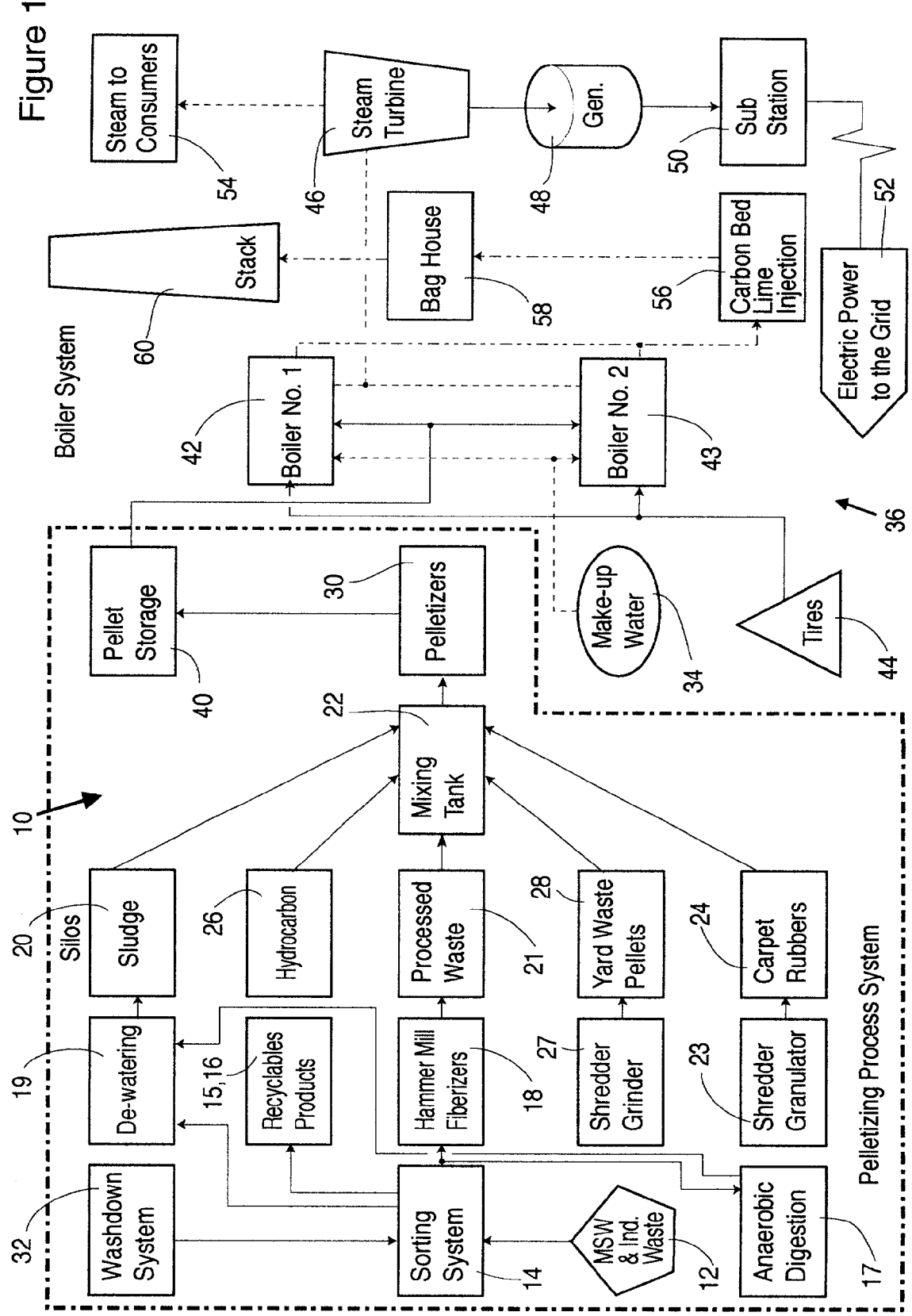
FIG. 1 is a schematic representation of a flow scheme of a municipal solid waste treatment process of the present invention.

FIG. 1 shows a preferred embodiment of a process of the present invention, generally indicated by 10. In process 10, municipal solid waste (MSW) and industrial waste 12 is introduced into sorting system 14. In sorting system 14, hazardous waste is separated. In addition, recyclable products 15 are separated and fed as feedstock to recycling plant 16. In one embodiment, some of the sorted waste obtained from sorting system 14, for example waste, sludges, food waste, wood and pulp residue, is sent to anaerobic digestion system 17. If the digester is filled to capacity, or otherwise, the remaining sorted waste is sent to hammer mill fiberizer system 18. In another embodiment, all of the sorted waste is sent to hammer mill fiberizer system 18.

Anaerobic digestion takes place in anaerobic digestion system 17, preferably for a period of approximately 15 to 25 days. Any gases produced from digestion of this sorted waste may be used to drive a gas-fired turbine, e.g. 5 MW, or to remove moisture from the waste later on in the process. Any residue from anaerobic digestion system 17 is sent to de-watering system 19, in which the residue is filtered and removed to sludge silo 20.

It is intended that the sorted municipal solid waste that is fed to hammer mill fiberizer system 18 be free or essentially free of hazardous waste. In addition, the municipal solid waste should be free of or have a low content of recyclable materials, especially of recyclable materials that may result in hazardous or unacceptable emission upon incineration i.e. on burning of the pellets described below. Such waste may be referred to herein as recyclable-free, hazardous waste-free municipal solid waste.

In hammer mill fiberizer system 18, the sorted waste is reduced to a fluff, which is sent to processed waste silo 21. The fluff in silo 21 is fed to mixing tank 22, where it is usually mixed with other waste products, for example, waste rubber and carpet from silos 23 and 24, hydrocarbons from silo 26, wood and yard waste from silos 27 and 28, and sludges from silo 20. Other high value BTU waste products may be mixed with these waste products. The mixed product obtained is pelletized using pelletizer system 30. After all municipal solid waste (MSW) and industrial waste 12 has been processed, washdown system 32 may be used to wash sorting system 14. The wash down water is collected by de-watering system 19, whereby the water is recycled and any residue filtered and removed to sludge silo 20. The recycled water is used as make-up water 34 for feeding to boiler system 36.

Pellets produced from pelletizer system 30 are sent to pellet storage 40. These pellets are fed to boiler system 36 and burned in boilers 42 and 43. The pellets may be combined with shredded (used) tires 44 and burned as a fuel source in boilers 42 and 43 to create steam.

To obtain the shredded tires, tires may be split and baled to remove all water and debris from the tires. The tires are then shredded. The shredded tires typically consist of sharply cut chips, averaging less than 2.5 cm×2.5 cm in size. The steel reinforcing used in tires may or may not be removed.

The steam produced in boilers 42 and 43 drives steam turbine 46, which in turn drives electrical generator 48 for generation of electricity for sub-station 50 and distribution as electrical power 52, or is distributed as thermal energy 54 to a consumer.

The burning of the pellets may produce flue gases. Carbon bed and lime injection system 56 is designed to neutralize these gases. The remaining emissions are sent to bag house 58, where any remaining particles are removed, before being released through stack 60 to the atmosphere.

Figure 2:
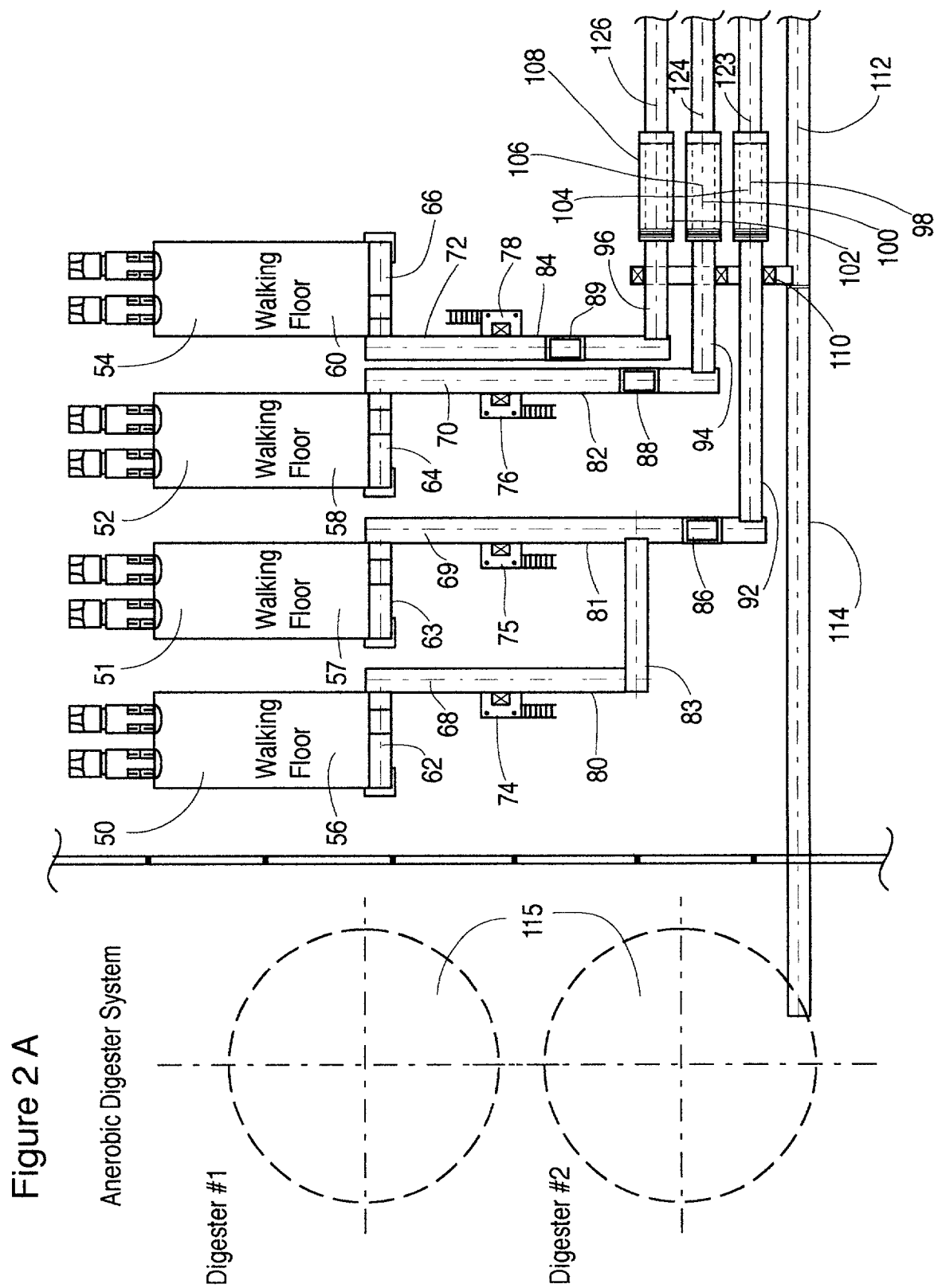
FIGS. 2A and 2B (together referred to as FIG. 2) schematically represent a sorting system of the treatment process.
Figure 2:
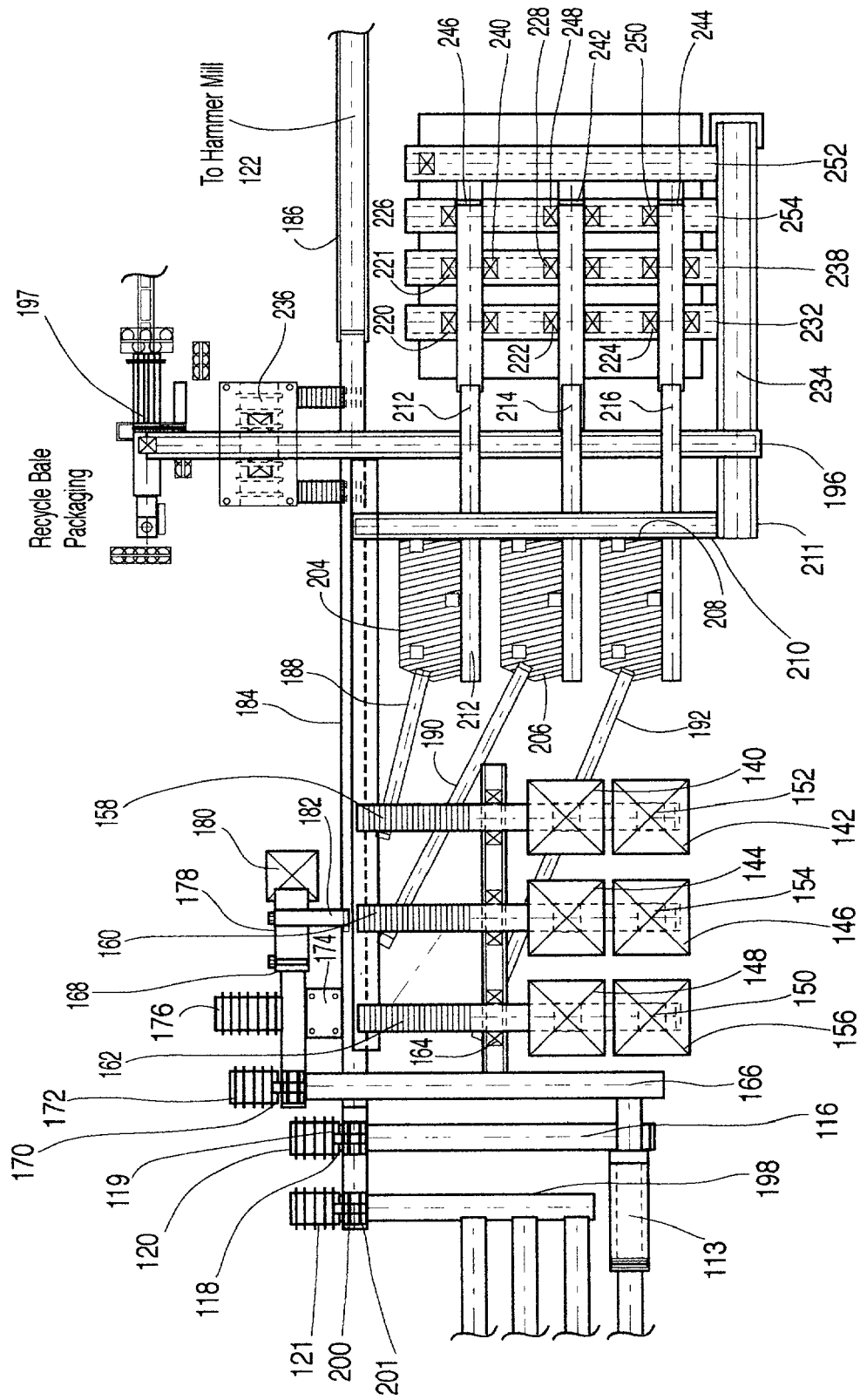
Figure 3:
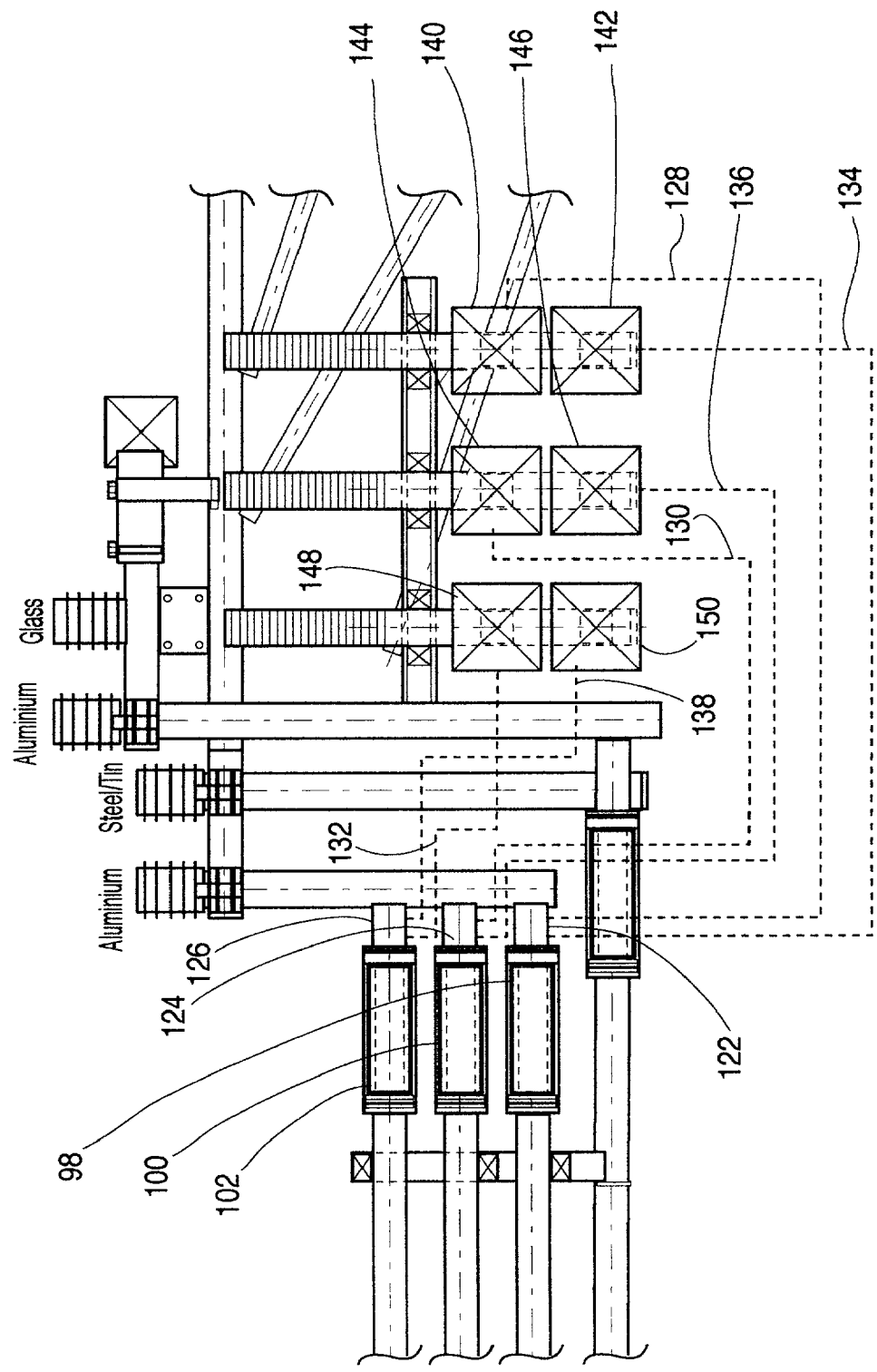
FIG. 3 is a schematic representation of a pneumatic air system of the sorting system.
Figure 4:
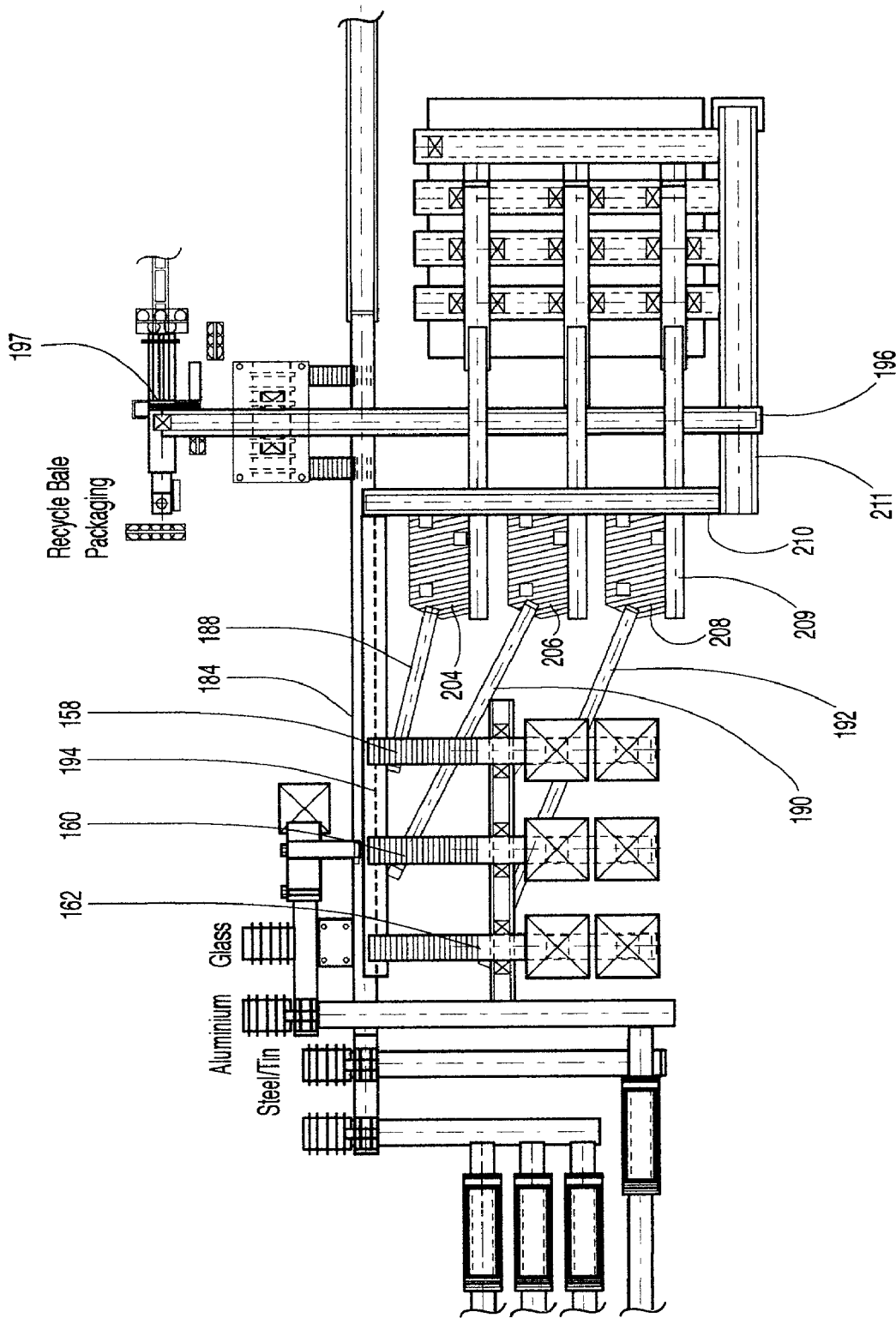
FIG. 4 is a schematic representation of an expanded view of a portion of the sorting system.

FIGS. 2, 3 and 4 shows a more detailed view of one embodiment of sorting system 14. In the embodiment shown, municipal solid waste 12 is off-loaded into one of three in-ground hopper systems 50, 51, 52 and 54 with live-bottom walking floors 56, 57, 58 and 60, respectively. On live-bottom walking floors 56, 57, 58 and 60, municipal solid waste 12 is inspected for any hazardous waste, which is removed.

Live-bottom walking floors 56, 57, 58 and 60 move municipal solid waste 12 to the back of hopper systems 50, 51, 52 and 54, respectively, where it drops onto transfer conveyer belts 62, 63, 64, and 66, respectively. Transfer conveyer belts 62, 63, 64, and 66 feed waste 12 onto inclined conveyer belts 68, 69, 70 and 72, respectively. Inclined conveyer belts 68, 69, 70 and 72 move waste 12 across pre-sorting platforms 74, 75, 76 and 78, respectively, where any large objects and undesirable waste are removed. Waste 12 is then dropped onto feed conveyors belts 80, 81, 82 and 84, respectively, where waste 12 from belt 80 drops onto belt 83. Waste 12 from belts 81 and 83 is fed into bag buster 86 and waste 12 from belts 82 and 84 is fed into bag busters 88 and 90, respectively, to remove the waste contained in garbage bags.

The resultant waste is subsequently fed onto large inclined conveyor belts 92, 94 and 96, respectively, that lead to trommel screen separators 98, 100 and 102, respectively. Any waste that is approximately 10 cm or less in size drops through onto fines discharge conveyor belts 104, 106 and 108, respectively, which lead to main fines discharge conveyor belt 110, then to fines inclined conveyor belt 112. This fine waste is fed into trommel screen separator 113 which allows any waste 5.0 cm or less in size to drop onto either reverse conveyor belt 114, which leads to anaerobic digester system 115, or ultra-fines discharge conveyor belt 116, which feeds onto first transport conveyor belt 117. When digester system 115 is filled to capacity, the waste on reverse conveyor belt 114 drops onto discharge conveyor belt 116, which feeds onto first transport conveyor belt 117.

Digester system 115 is intended to receive farm waste, sludges, food waste, wood and pulp residue. In embodiments, digestion takes 15 to 25 days. Any gases produced from the digestion step may be used to drive a gas-fired turbine, e.g. 5 MW, or remove moisture from the processed waste later on in the process. Any residue from digester system 115 is sent to a de-watering system (not shown), whereby the residue is filtered and removed to sludge silo 289.

The fine waste from conveyor belt 116 passes through ferrous magnetic separator 118, where any tins or other ferrous metals are separated. The ferrous-free waste passes through non-ferrous magnetic separator 119, where any aluminum or other non-ferrous metals are separated. The separated ferrous metal is placed into ferrous metal bin 120 and any non-ferrous metal is placed into non-ferrous metal bin 121. The remaining waste is sent to hammer mill 122 via conveyor belt 117 (not shown; under conveyor belt 184).

The waste not separated by trommel screen separators 98,100 and 102 drops onto discharge conveyor belts 123, 124 and 126, respectively. Any light-weight waste, such as fibre e.g. newspaper, cardboard etc., as well as plastics and some aluminum cans, will be lifted out via a pneumatic air system, which may be air knife containing ducts 128, 130 and 132, respectively, (shown in FIG. 3). Any smaller particles are removed by dust collecting ducts 134, 136 and 138, respectively (shown in FIG. 3). The light-weight waste is then transferred from the ducts (128 and 134), (130 and 136), and (132 and 138) to hoppers (140 and 142), (144 and 146) and (148 and 150), respectively. The light-weight waste thus obtained drops from hoppers (140 and 142), (144 and 146), and (148 and 150) onto in-feed conveyor belts 152, 154, and 156, respectively.

The light-weight waste on in-feed conveyor belts 152, 154, and 156 drops onto OCC star screens 158, 160 and 162, respectively. Portions of OCC star screens 158, 160 and 162 that lie over discharge conveyor belt 164 have a high number of stars per unit area that allows waste, such as glass and aluminum cans, to pass through onto discharge conveyor belt 164. Discharge conveyor belt 164, feeds onto a second discharge conveyor belt 166, from which it is discharged onto overs conveyor belt 168. Any aluminum or other non-ferrous metals is separated from this waste by non-ferrous magnetic separator 170 and placed into bin 172. Any glass is separated at glass separation stage 174 and placed into bin 176. Any tins or other ferrous metals will be separated by ferrous magnetic separator 178 and placed into bin 180. The remaining waste drops onto small overs conveyor belt 182 and then onto second transport conveyor belt 184. Second transport conveyor belt 184 carries the waste through heated tunnel 186 to hammer mill 122. Heated tunnel 186 is usually used during the winter months when the waste has a high water content. Gases produced from digester system 115, as discussed above, may be used to heat tunnel 186.

The waste that fails to fall through the portion of the star screens with a high number of stars per unit area is carried along to a portion with a low number of stars per unit area that allows fine paper and plastics to fall through onto pre-sorting conveyor belts 188, 190, and 192. Larger light-weight waste, such as newspaper, corrugated cardboard and large sheets of plastic, that fail to fall through star screens 158, 160 and 162, are dropped onto conveyor belt 194 (shown in FIG. 4), which leads to inclined conveyor 196 and finally to automatic baler 197. Automatic baler 197 bales all the recyclable waste products, such as aluminum cans, tin cans, newspaper, corrugated cardboard and plastics. The baled product is sent to a recycling plant.

The remaining waste left on discharge conveyor belts 123, 124 and 126 drops onto feed conveyor belt 198. This waste passes through ferrous magnetic separator 200, where any tins or other ferrous metal is separated from the waste. The remaining waste passes through non-ferrous magnetic separator 201, where any aluminum or other non-ferrous metal is separated. Any ferrous metal separated is placed into the ferrous metal section of double bin 202 and any non-ferrous metal is placed into the non-ferrous metal section of double bin 202. The remaining waste is dropped onto second transport conveyor belt 184, which carries the waste to hammer mill 122.

The fine paper and plastics that pass through OCC star screens 158, 160 and 162 and onto pre-sorting conveyor belts 188, 190, and 192, drop onto OCC star screens 204, 206 and 208, respectively, with an ultra-low number of stars per unit area. The plastics remain on top of the star screens and the paper falls through into a fine paper hopper (not shown) located under OCC star screen 204, 206 and 208. The fine paper hopper feeds onto fine paper conveyor belt 210, which carries the paper to transfer conveyor 211, to inclined conveyor belt 196 and to baler 197. The plastic that remains on top of OCC star screens 204, 206 and 208 is dropped onto plastic conveyor belts 212, 214 and 216, respectively.

Plastic conveyor belts 212, 214 and 216 carry the plastic to plastic separating system 218, where the plastics are sorted by grade (type). For instance, one particular grade of plastic is placed into hoppers 220, 222 and 224, while a second particular grade of plastic is placed into hoppers 226, 228 and 230. The plastics in hoppers 220, 222 and 224 are discharged onto conveyor belt 232, carried to discharge conveyor belt 234, to inclined conveyor belt 196, through sorting station 236 to automatic baler 197, where it is baled. Similarly, the plastics in hoppers 226, 228 and 230 are discharged onto conveyor belt 238 and carried to discharge conveyor belt 234. Discharge conveyor belt 234 directs the plastics to inclined conveyor belt 196, through sorting station 236, and finally, to automatic baler 197, where the plastic is baled.

The baled plastics are sent to the recycling plant. At sorting station 236, the operator controls which of conveyor belts, 232 or 238, empty onto discharge conveyor belt 234 at any given time, depending on the particular grade of plastic the operator chooses to bale.

The remaining plastic on conveyor belts 212, 214 and 216 passes through ferrous magnetic separators 240, 242 and 244, respectively, where any tins or other ferrous metal is separated from the waste, and through non-ferrous magnetic separators 246, 248 and 250, respectively, where any aluminum or other non-ferrous metal is separated. Any ferrous metal separated is placed into the ferrous metal section of a double bin (not shown) and any non-ferrous metal is placed into the non-ferrous metal section of the same double bin. The remaining waste drops onto discharge conveyor belt 252, which carries the waste to conveyor belt 254 and drops it onto discharge conveyor belt 234.

In one embodiment, any wood and/or large items, such as furniture, separated at pre-sorting platforms 74, 76 and 78 is taken to grinder 256 (shown in FIG. 5), where the wood and/or large items are ground up. The ground material is lifted out via a second pneumatic air system 258 and carried to hammer mill 122.

Figure 5:
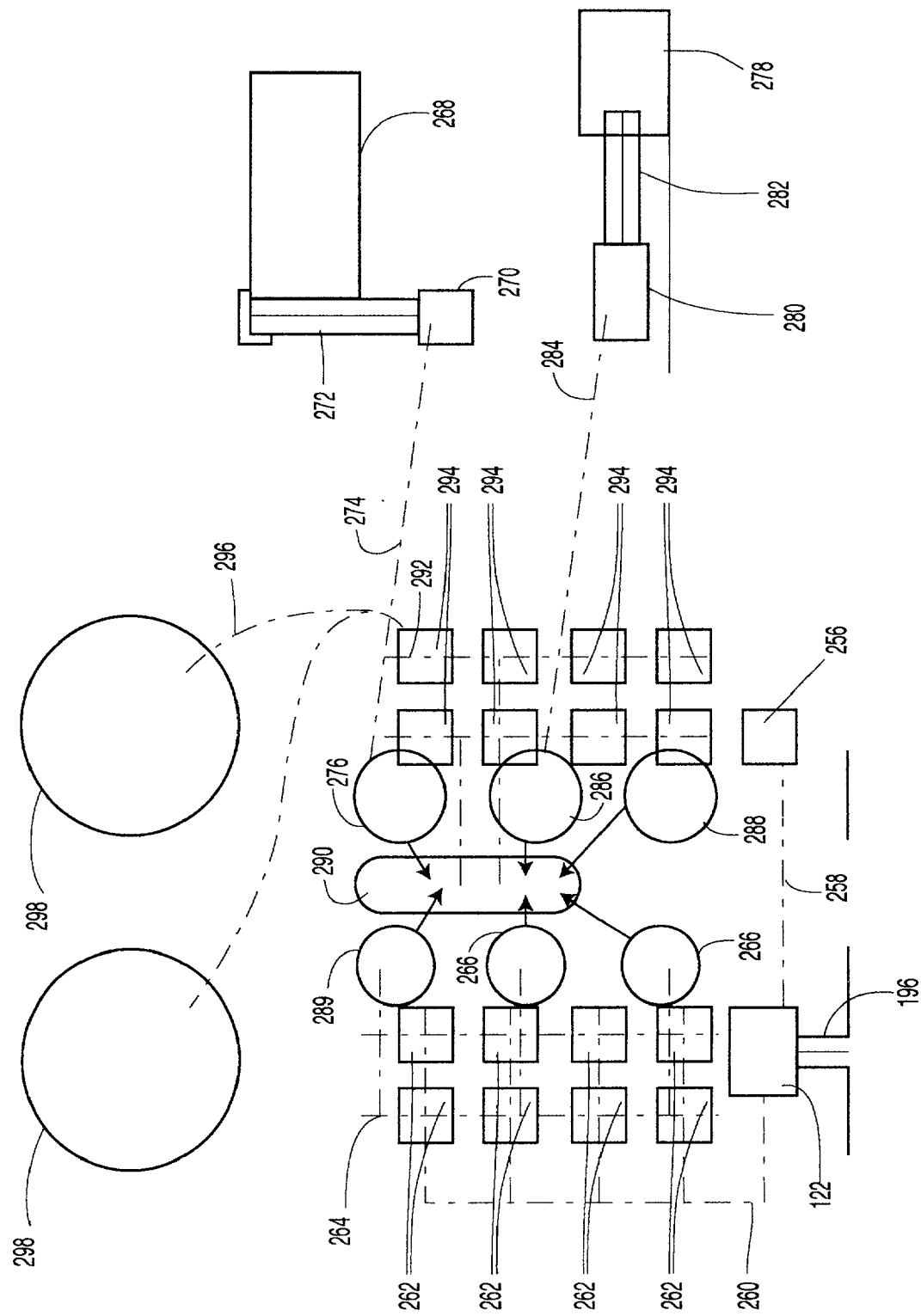
FIG. 5 is a schematic representation of a pulverizing, mixing, and pelletizing system of the treatment process.

FIG. 5 shows a more detailed view of one particular embodiment of hammer mill fiberizer system 18, mixing tank 22, pelletizer system 30 and pellet storage 40 of FIG. 1. In hammer mill 122, as shown in FIG. 5, all of the waste materials transported to the hammer mill are broken down into, approximately, 2.5 cm pieces, it being understood that the size may be varied. These pieces are lifted out using pneumatic air system 260 and deposited into pulverizers 262, where the pieces are ground into a fine fluff. The fine fluff is removed using pneumatic air system 264, and deposited in holding silos 266.

Waste rubber and safe industrial waste are loaded into large hopper 268 and sent to grinder/granulator 270 via in-feed conveyor belt 272. Pneumatic air system 274 transfers the granulated waste rubber and industrial waste and deposits it in holding silo 276. Similarly, waste carpet is loaded into large hopper 278 and sent to shredder 280 via in-feed conveyor belt 282. Pneumatic air system 284 transfers the shredded carpet and deposits it in holding silo 286.

Hydrocarbons, such as petroleum coke dust, are loaded into holding silo 288 directly from a transport vehicle.

The residue from anaerobic digestion system 115 is eventually sent to holding silo 289.

To limit the number of silos used, more than one type of waste may be transferred to a particular silo, although the BTU values should be similar to facilitate control of the process.

Processed waste products in silos 266, 276, 286 and 289 are fed into mixing tank 290 using volumetric metering valves, which are controlled by a computer system. The waste treatment system is programmed and controlled to select the appropriate amount of waste from each silo depending on the BTU value of the high fuel value pellet that is to be manufactured. In tank 290, all of the processed waste products that are metered in are mixed together. The resultant mixture is blown, via pneumatic air system 292, into pelletizers 294. The pellets produced are blown, via pneumatic air system 296, to storage silos 298.

In pelletizer 294, pellets of high fuel value are produced. The pellets may have a range of dimensions but are preferably cylindrical or substantially cylindrical to facilitate transportation and burning. The pellets should have diameter of at least 2.5 cm, and especially in the range of 3.5-8 cm. The pellets should have a length of at least 3 cm, and especially in the range of 5-15 cm. In one example of the pellets, the pellets produced have a diameter of approximately 4.4 cm and a length of approximately 8 cm. No binder, such as lime, is required.

The pellets of the invention have moisture contents of less than 10% by weight, and especially less than 6% by weight. In preferred embodiments, the moisture content is less than 2.5% by weight. Removal of water increases the BTU value of the product up to at least 12000 BTU, preferably 12500 to 14000 BTU, especially at least 14000 BTU, per pound, and eliminates odours.

Figure 6:
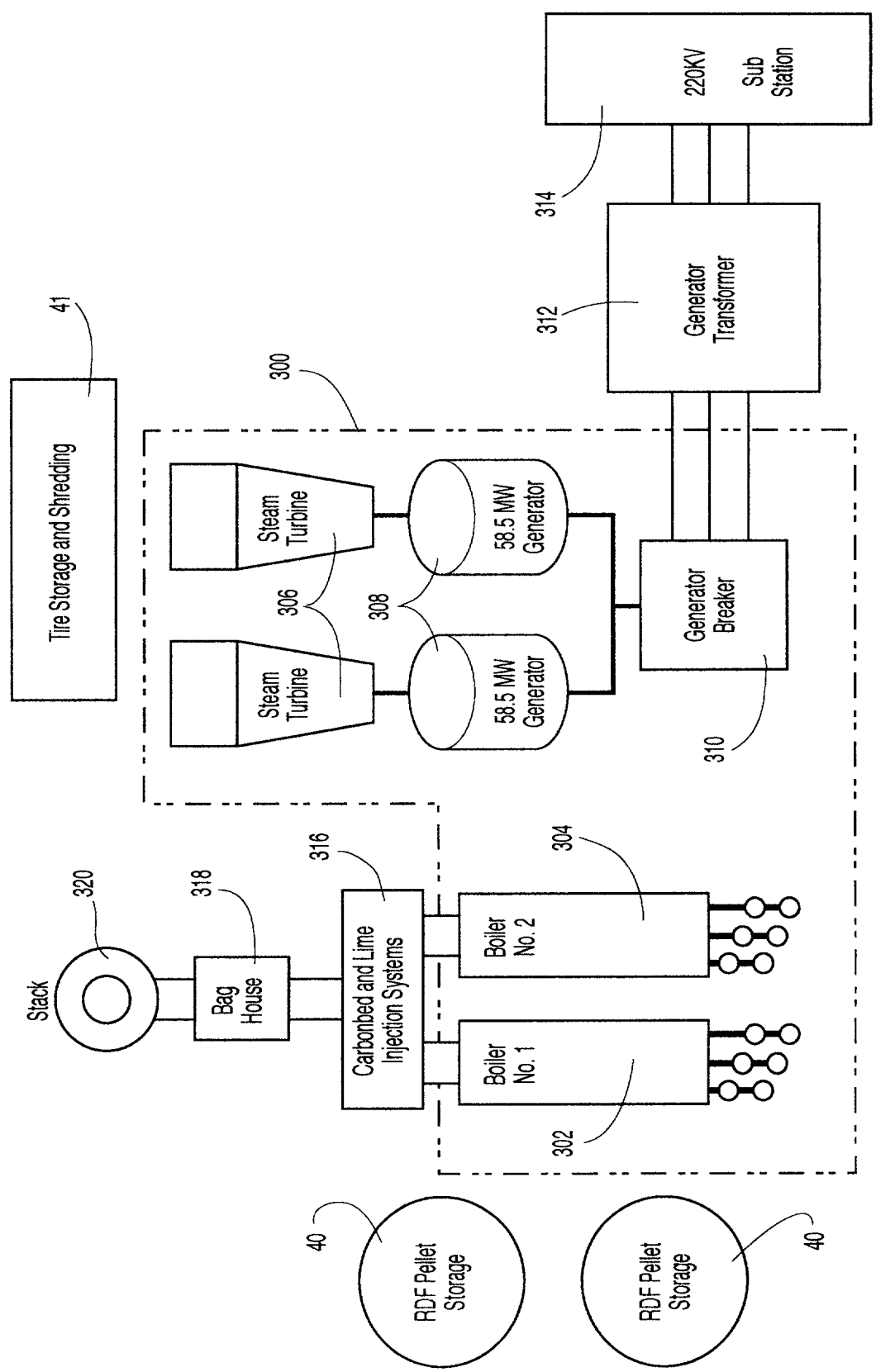
FIG. 6 is a schematic representation of an embodiment of a boiler system of the treatment process.

FIG. 6 shows a more detailed view of one embodiment of boiler system 36. Pellets are burned using a water wall boiler system 300, which preferably has fluidized-beds and rotary grates that retain pellets in the boiler. This results in an efficient burn that produces the maximum BTU per pound of fuel and the least amount of bottom ash. Preferably, a combustion zone with a temperature of at least 1100° C. and especially at least 1150° C. is maintained for at least 15 minutes without any waste feeding water wall boiler system 300.

In embodiments, the firing of auxiliary burners and supply of combustion air may be modulated automatically to maintain a minimum combustion zone temperature such that steam can be created. In this embodiment, the steam produced from boilers 302 and 304 drive steam turbines 306 (transfer pipe not shown) that in turn drive synchronous electrical generators 308 for generating electrical power. The superheated medium of high-pressure steam, fed to turbines 306, is sent to consumers for heating purposes. Generator breaker 310 is integrated into the system to act as an on/off switch to send power to generator transformer 312. The electricity may be generated at, for example, 13.8 kV and transformed at generator transformer 312 to generate 230 kV or 113 kV of power at sub-station 314.

The burning of pellets may produce flue gases resulting from the burning of chlorinated hydrocarbons, bacteria, toxins and decaying waste. FIG. 6 shows one embodiment of carbon bed and lime injection system 316, designed to neutralize any acidic gases. The flue gases pass through carbon bed and lime injection system 316. The lime injection section of system 316 allows counter current lime injection into a stream of flue gases, which increases the mixing of lime and the flue gases, such that the lime reacts with the flue gases, in particular acid gases. Solid products such as calcium sulphate, calcium chloride, fly ash and other particulate matter are removed through bag house system 318. Cleaned gases are then discharged through stack 320. A Nalco Fuel Tech $NO_x$ emission control may be installed on the stack for monitoring.

In a preferred embodiment, the emissions released from combustion of the pellet are less than 17 mg/$Rm^3$ of particulate matter, less than 14 µg/$Rm^3$ of cadmium, less than 142 µg/$Rm^3$ of lead, less than 20 µg/$Rm^3$ of mercury, less than 0.14 ng/$Rm^3$ of dioxin/furan, less than 27 mg/$Rm^3$ of hydrochloric acid, less than 56 mg/$Rm^3$ of sulphur dioxide and less than 110 ppmv of nitrogen oxides. These emissions are based on Ontario Regulation A7 Guidelines for municipal waste incinerators dated September 2000.

High density pellets produced from process 10 are believed to burn longer, produce more heat and leave fewer residues than other pellets. As the process is operated with the intention of removal of all of the recyclables, heavy metal emissions associated with these waste derived fuels would be minimized.

It is preferred that waste 12 is processed on the day of receipt at the facility operating the system, with each sorting system 14 processing up to 32 tons per hour. More preferably, there is no storage of municipal waste overnight, which permits the system to be washed down on a daily basis. All water from the municipal solid waste and wash-down can be collected in an underground holding tank. The water can be treated, cleaned and reused. Periodically e.g. every three months, any solids may be extracted and mixed with incoming municipal solid waste to produce more pellets.

The treatment system of the invention would normally be controlled by a suitable computer programme that receives data on the various wastes fed to the system.

It is preferred that all of the sorting systems be fabricated with heavy steel pans and conveyor belts and equipped with productivity-enhanced features such as interval switches, variable speed self-cleaning sorting belts, overload disconnects and electronic eyes. The system can be fully interlocked with programmable logic controllers (PLC) to control all the safety devices such as photo-cells, limit switches and flow switches. The PLC's can be set up to control the start up and shut down sequences. The whole system can be tied into a distributed control system (DCS) and controlled by a main computer.

A biological air filtration system can be installed to change the air frequently e.g. every 10 minutes, collect all the moisture and eliminate odours, thereby allowing for comfortable and clean air-working atmosphere.

Dust, odour and debris emissions can be minimized in the process facility by maintaining a negative air pressure in the entire waste receiving and processing area. Fresh air may be continuously introduced.

The pellets obtained by the process of the present invention may be burned so as to produce less than 10% by weight of bottom ash, preferably 3-8% by weight of bottom ash, more preferably 3-4% by weight of bottom ash, which is inert enough to be used for road fill. Fly ash can also be produced. Since the ash is from a processed pellet of the present invention, it does not contain any or only a minimal amount of hazardous products and as a result can be used as a filler in cement.

Another embodiment of the processing system of the present invention involves coupling of the system to a biogas system. The biogas system involves producing methane gas from the fermentation of waste materials such as municipal solid waste, organic waste and food matter. A biogas system accelerates this natural fermentation process by passing the waste through a series of aerobic "digesters". As noted above, at the end of this particular process, approximately 98% of the input waste remains. By coupling the present processing system with a biogas system, the methane gas produced initially from the biogas system can be used to energize the boilers of the processing system. Moreover, the remaining waste from the biogas system can be processed according to the present invention and formed into high fuel value pellets.

It is believed that the process of the present invention will reduce the need for landfill sites and provide a long term solution to waste disposal. This process is capable of recycling more products from the waste stream than generally accomplished in existing commercial systems, while providing a fuel that burns cleaner than coal or oil.

The present invention is illustrated by the following examples:

EXAMPLE 1

Municipal solid waste was processed using apparatus similar to that shown in FIGS. 2-5. In the process, municipal solid waste was mixed with various high BTU value wastes to yield a pellet having a composition as listed in Table 1. In one embodiment, the pellet obtained had a BTU value of 10,515 BTU/lb.

TABLE 1

| Product | BTU/lb | Per % | Value |
| --- | --- | --- | --- |
| MSW | 8,000 | 64 | 5,120 |
| Hydrocarbons | 16,000 | 18 | 2,880 |
| Carpet | 16,500 | 11 | 1,815 |
| Wood | 10,000 | 7 | 700 |
| Total | | 100 | 10,515 |

The pellets of the type described above were analyzed and then incinerated at a temperature of approximately 1100° C. The results obtained are given in Table 2.

TABLE 2

| Description | | Pelletized | Loose |
| --- | --- | --- | --- |
| Moisture Content | % Weight | 4.41 | 9.37 |
| Volatile Matter | % Weight | 69.48 | 34.35 |
| Fixed Carbon[1] | % Weight | 12.94 | 53.75 |
| Ash[2] | % Weight | 3.17 | 2.53 |
| Fuel Value | BTU/lb | 10500 | 11022 |

[1]Includes the residual carbon left (part of bottom ash) after pellet combustion.
[2]Includes both bottom ash and fly ash.

This example shows that pellets having a BTU value of greater than 10000 BTU/pound could be obtained from municipal solid waste. The moisture content of the pellets was less than 10% by weight and the ash content after burning was less than 3.5%.

EXAMPLE 2

Municipal solid waste was processed using apparatus similar to that shown in FIGS. 2-5. In the process, waste was mixed with various high BTU value wastes to yield a pellet having a composition as listed in Table 3. The pellets obtained had a BTU value of 13,970 BTU/lb. The pellet's moisture content was 6% and the bottom ash produced from combustion of this pellet was 4%.

TABLE 3

| Product | BTU/lb | Per % | Value |
| --- | --- | --- | --- |
| MSW | 8,000 | 41 | 3,280 |
| Hydrocarbons | 16,000 | 14 | 2,240 |
| Carpet | 16,500 | 14 | 2,310 |
| Granulated Rubber | 22,000 | 14 | 3,080 |
| Automobile Insulation | 18,000 | 17 | 3,060 |
| Total | | 100 | 13,970 |

EXAMPLE 3

Municipal solid waste was processed using apparatus similar to that shown in FIGS. 2-5. In the process, municipal solid waste was mixed with various high BTU value wastes to yield a pellet having a composition as listed in Table 4 and having a BTU value of 12,580 BTU/lb. The pellet's moisture content was 6% and the bottom ash produced from combustion of this pellet was 4%.

TABLE 4

| Product | BTU/lb | Per % | Value |
| --- | --- | --- | --- |
| MSW | 8,000 | 53 | 4,240 |
| Hydrocarbons | 16,000 | 11 | 1,760 |
| Carpet | 16,500 | 12 | 1,980 |
| Granulated Rubber | 22,000 | 11 | 2,420 |
| Automobile Insulation | 18,000 | 11 | 1,980 |
| Wood | 10,000 | 2 | 200 |
| Total | | 100 | 12,580 |

The invention claimed is:

1. A combustible pellet produced by a method comprising:
  a) removing hazardous waste and recyclable products from municipal solid waste to form recyclable-free, hazardous waste-free municipal solid waste, wherein the recyclable-free, hazardous waste-free municipal solid waste is approximately or completely free of glass, metals, plastics, and paper;
  b) treating the recyclable-free, hazardous waste-free municipal solid waste to form a fluff;
  c) adding at least one waste substance having a fuel value of at least 10,000 BTU per pound after (b); and d) compacting the fluff with said at least one waste substance to form a combustible pellet having a fuel value of at least 10,000 BTU per pound.

2. The pellet of claim 1 in which said at least one waste substance is selected from hydrocarbon material, safe industrial waste, commercial and institutional waste, wood, rubber, fibrous material and other waste having a fuel value of at least 10,000 BTU per pound.

3. The pellet of claim 1 in which said at least one waste substance is selected from the group consisting of hydrocarbons, carbon, safe industrial waste, commercial and institutional waste, carpet, underlay, vinyl flooring, rubbers, tires, automotive insulation, compost residue, coal dust, fabrics, leather, furniture, peat, hemp, jute, sugarcane, coconut husks, corn husks, rice hulls, sewage sludges, wood and paper fibres, and mixtures thereof.

4. The pellet of claim 3 in which the hydrocarbon is petroleum coke, the carbon is bottom ash, the rubber is synthetic rubber, the wood is selected from the group consisting of bark, chips, sawdust, plywood, particle board, pallets, skids, bush, tree branches and yard waste, and fibres are selected from the group consisting of corrugated cardboard, newspaper, packaging, box board, aseptic board and pulp sludges.

5. The pellet of claim 4 in which the emissions released from combustion of the pellet are less than 17 mg/Rm$^3$ of particulate matter, less than 14 µg/Rm$^3$ of cadmium, less than 142 µg/Rm$^3$ of lead, less than 20 µg/Rm$^3$ of mercury, less than 0.14 ng/Rm$^3$ of dioxin/furan, less than 27 mg/Rm$^3$ of hydrochloric acid, less than 56 mg/Rm$^3$ of sulphur dioxide and less than 110 ppmv of nitrogen oxides.

6. The pellet of claim 4 which, on combustion at a temperature of 1150° C. in air, has a bottom ash content of less than 10% by weight.

7. The pellet of claim 4 in which the fuel value of the pellet is at least 12,000 BTU per pound.

8. The pellet of claim 7 in which the fuel value of the pellet is in the range of 12500-14000 BTU per pound.

9. The pellet of claim 7 in which the fuel value of the pellet is at least 14,000 BTU per pound.

10. The pellet of claim 4 in which the water content of the pellet is in the range of 1-7 percent by weight.

11. The pellet of claim 4 in which the pellet has a length of at least 3 cm and a width of at least 1 cm.

12. The pellet of claim 11 in which the pellet has a length of 5-15 cm and a width of 3.5-8 cm.

13. The pellet of claim 4 in which the cross-section of the pellet is substantially circular.

14. A process for forming a combustible pellet from municipal solid waste, comprising:
 a) removing hazardous waste and recyclable products from the municipal solid waste to form recyclable-free, hazardous waste-free municipal solid waste, wherein the recyclable-free, hazardous waste-free municipal solid waste is approximately or completely free of glass, metals, plastics, and paper;
 b) treating the recyclable-free, hazardous waste-free municipal solid waste to form a fluff;
 c) adding at least one waste substance having a fuel value of at least 10,000 BTU per pound after (b); and
 d) compacting the fluff with said at least one waste substance to form a combustible pellet having a fuel value of at least 10,000 BTU per pound.

15. The process of claim 14 in which anaerobic digestion follows (a).

16. The process of claim 15, wherein digestion takes about 15 to 25 days.

17. The process of claim 15 or claim 16, wherein gas is produced from digestion.

18. The process of claim 17, wherein the gas drives a gas-fired turbine engine.

19. The process of claim 17, wherein the gas is used to dry the waste.

20. The process of claim 14 in which said at least one waste substance is selected from hydrocarbon material, safe industrial waste, commercial and institutional waste, wood, rubber, fibrous material and other waste having a fuel value of at least 10,000 BTU per pound.

21. The process of claim 14 in which said at least one waste substance is selected from the group consisting of hydrocarbons, carbon, safe industrial, commercial and institutional waste, carpet, underlay, vinyl flooring, rubbers, tires, automotive insulation, compost residue, coal dust, fabrics, leather, furniture, peat, hemp, jute, sugarcane, coconut husks, corn husks, rice hulls, sewage sludges, wood and paper fibres, and mixtures thereof.

22. The process of claim 21 in which the hydrocarbon is petroleum coke, the carbon is bottom ash, the rubber is synthetic rubber, the wood is selected from the group consisting of bark, chips, sawdust, plywood, particle board, pallets, skids, bush, tree branches and yard waste, and fibres are selected from the group consisting of corrugated cardboard, newspaper, packaging, box board and aseptic board, and pulp sludges.

23. The process of claim 14 in which the emissions released from combustion of the pellet are less than 17 mg/Rm$^3$ of particulate matter, less than 14 µg/Rm$^3$ of cadmium, less than 142 µg/Rm$^3$ of lead, less than 20 µg/Rm$^3$ of mercury, less than 0.14 ng/Rm$^3$ of dioxin/furan, less than 27 mg/Rm$^3$ of hydrochloric acid, less than 56 mg/Rm$^3$ of sulphur dioxide and less than 110 ppmv of nitrogen oxides.

24. The process of claim 14 in which, on combustion at a temperature of 1150° C. in air, the pellet has a bottom ash content of less than 10% by weight.

25. The process of claim 14 in which the fuel value of the pellet so obtained is at least 12,000 BTU per pound.

26. The process of claim 25 in which the fuel value of the pellet so obtained is in the range of 12,500-14,000 BTU per pound.

27. The process of claim 25 in which the fuel value of the pellet so obtained is at least 14,000 BTU per pound.

28. The process of claim 14 in which a water content of the pellet so obtained is in the range of 1-7 percent by weight.

29. The process of claim 14 in which the pellet so obtained has a length of at least 3 cm and a width of at least 1 cm.

30. The process of claim 29 in which the pellet so obtained has a length of 5-15 cm and a width of 3.5-8 cm.

31. The process of claim 14 in which the cross-section of the pellet so obtained is substantially circular.

32. The pellet of claim 4 in which a water content of the pellet is less than 10% by weight.

33. The pellet of claim 6, in which, on combustion at a temperature of 1150° in air, the pellet has a bottom ash content of 3-8% by weight.

34. The process of claim 14 in which a water content of the pellet is less than 10% by weight.

35. The process of claim 24, in which, on combustion at a temperature of 1150° in air, the pellet has a bottom ash content of 3-8% by weight.

36. The process of claim 14, in which (b) comprises shredding and pulverizing to form the fluff.

37. A process for forming a combustible pellet from municipal solid waste, comprising:
- a) removing hazardous waste and recyclable products from the municipal solid waste to form recyclable-free, hazardous waste-free municipal solid waste, wherein the recyclable-free, hazardous waste-free municipal solid waste is approximately or completely free of glass, metals, plastics, and paper;
- b) treating the recyclable-free, hazardous waste-free municipal solid waste to form a fluff;
- c) adding at least one waste substance having a fuel value of at least 10,000 BTU per pound before (b); and
- d) compacting the fluff with said at least one waste substance to form a combustible pellet having a fuel value of at least 10,000 BTU per pound.

38. A combustible pellet produced by a method comprising:
- a) removing hazardous waste and recyclable products from municipal solid waste to form recyclable-free, hazardous waste-free municipal solid waste, wherein the recyclable-free, hazardous waste-free municipal solid waste is approximately or completely free of glass, metals, plastics, and paper;
- b) treating the recyclable-free, hazardous waste-free municipal solid waste to form a fluff;
- c) adding at least one waste substance having a fuel value of at least 10,000 BTU per pound before (b); and
- d) compacting the fluff with said at least one waste substance to form a combustible pellet having a fuel value of at least 10,000 BTU per pound.

* * * * *

UNITED STATES PATENT AND TRADEMARK OFFICE
CERTIFICATE OF CORRECTION

PATENT NO.        : 7,252,691 B2
APPLICATION NO. : 09/801182
DATED             : August 7, 2007
INVENTOR(S)      : Philipson It is certified that error appears in the above-identified patent and that said Letters Patent is hereby corrected as shown below:

On the face page, in field (56), under "U.S. Patent Documents", in column 1, line 2, delete "Sircusa" and insert -- Siracusa --, therefor.

On Sheet 1 of 7, FIGURE 1, (Box 15, 16), line 1, delete "Recyclables" and insert -- Recyclable --, therefor.

On Sheet 2 of 7, FIGURE 2A, line 1, delete "Anerobic" and insert -- Anaerobic --, therefor.

On Sheet 7 of 7, FIGURE 6, (Box 316), line 1, delete "Carbonbed" and insert -- Carbon bed --, therefor.

In column 2, line 44, delete "5500" and insert -- 5,500 --, therefor.

In column 2, line 44, delete "7000 to 9000" and insert -- 7,000 to 9,000 --, therefor.

In column 3, line 19, delete "10 000" and insert -- 10,000 --, therefor.

In column 3, line 51, delete "12500-14000" and insert -- 12,500-14,000 --, therefor.

In column 4, lines 42-43, delete "10000" and insert -- 10,000 --, therefor.

In column 5, line 9, delete "2500" and insert -- 2,500 --, therefor.

In column 5, line 11, delete "4000 to 7000" and insert -- 4,000 to 7,000 --, therefor.

In column 7, line 15, delete "98,100" and insert -- 98, 100 --, therefor.

In column 9, line 45, delete "12000" and insert -- 12,000 --, therefor.

In column 9, lines 45-46, delete "12500 to 14000" and insert -- 12,500 to 14,000 --, therefor.

In column 9, line 46, delete "14000" and insert -- 14,000 --, therefor.

In column 11, (Col. 3) (Table 2), line 6, delete "10500" and insert -- 10,500 --, therefor.

In column 11, (Col. 4) (Table 2), line 6, delete "11022" and insert -- 11,022 --, therefor.

In column 12, line 2, delete "10000" and insert -- 10,000 --, therefor.

UNITED STATES PATENT AND TRADEMARK OFFICE
CERTIFICATE OF CORRECTION

PATENT NO.         : 7,252,691 B2
APPLICATION NO. : 09/801182
DATED                 : August 7, 2007
INVENTOR(S)        : Philipson It is certified that error appears in the above-identified patent and that said Letters Patent is hereby corrected as shown below:

In column 13, line 25, in Claim 5, delete "4" and insert -- 1 --, therefor.

In column 13, line 32, in Claim 6, delete "4" and insert -- 1 --, therefor.

In column 13, line 35, in Claim 7, delete "4" and insert -- 1 --, therefor.

In column 13, line 38, in Claim 8, delete "12500-14000" and insert -- 12,500-14,00 --, therefor.

In column 13, line 41, in Claim 10, delete "4" and insert -- 1 --, therefor.

In column 13, line 43, in Claim 11, delete "4" and insert -- 1 --, therefor.

In column 13, line 47, in Claim 13, delete "4" and insert -- 1 --, therefor.

In column 14, line 56, in Claim 32, delete "4" and insert -- 1 --, therefor.

In column 14, line 59, in Claim 33, after "1150°" insert -- C. --.

In column 14, line 64, in Claim 35, after "1150°" insert -- C. --.

Signed and Sealed this

Fourteenth Day of October, 2008

JON W. DUDAS
*Director of the United States Patent and Trademark Office*